Nov. 1, 1966     P. J. FELKER     3,283,053
METHOD FOR FORMING NON-SKID TIRE TREADS
Filed Jan. 21, 1965     2 Sheets-Sheet 1

INVENTOR
Paul J. Felker
BY
Morell & Morell
ATTORNEYS

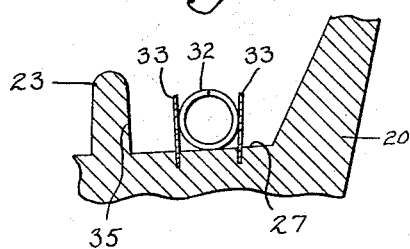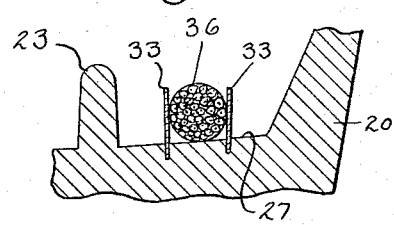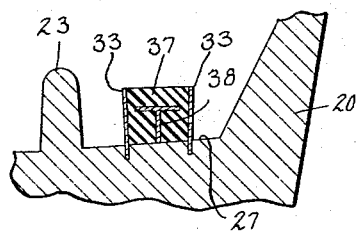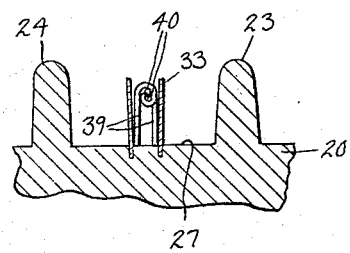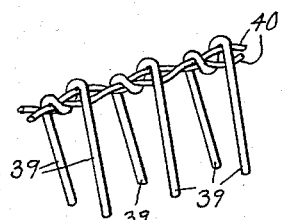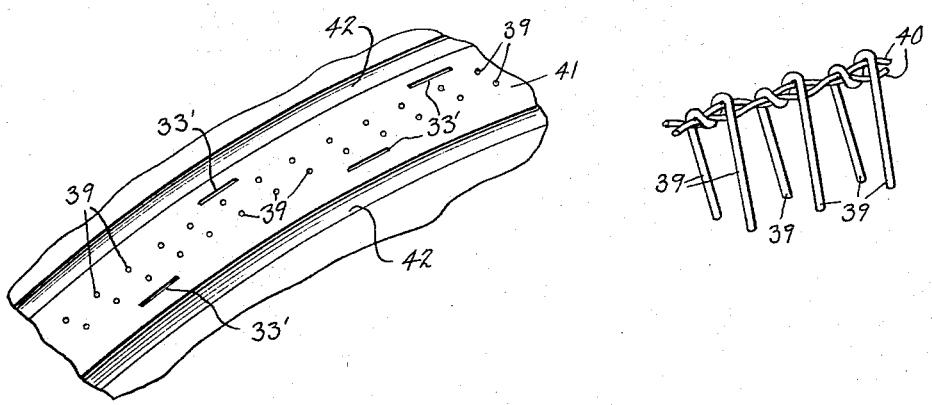

United States Patent Office 3,283,053
Patented Nov. 1, 1966

3,283,053
METHOD FOR FORMING NON-SKID TIRE TREADS
Paul J. Felker, Marshfield, Wis., assignor to Penetred Corporation, Marshfield, Wis., a corporation of Wisconsin
Filed Jan. 21, 1965, Ser. No. 426,900
3 Claims. (Cl. 264—277)

This invention relates to improvements in the method for forming non-skid tire treads.

The original manufacture of a tire and a retreading operation are very similar. In fact, the retreading operation involves some of the same steps as original tire manufacture, and during these steps, very similar equipment is employed in both. In the curing stage of both operations the tire casing surrounds an inflatable annular core and is surrounded by a steam jacketed annular matrix. The core is inflated and the pressure therefrom (which is similar to the action of an inflated inner tube) forces the uncured rubber of the tire against the hot matrix. The matrix is formed on its tire engaging surface with a contour which corresponds to the contour desired on the finished tire. The uncured rubber is forced into the pattern of the matrix, and after a predetermined period of exposure to the heat and pressure above mentioned, the curing of the rubber is complete and the tire is removed from the matrix.

In the manufacture of tires having elongated, traction-augmenting members, such as metal coils, embedded in the treads thereof, a matrix having spaced, circumferentially-extending grooves which are generally rectangular in cross section has customarily been used. These grooves form spaced, circumferentially-extending tread or rider strips on tires cured in the matrix. In order to embed elongated traction-augmenting members, such as metal coils in the rider strips of the tire, the coils have been placed in the grooves of the matrix prior to the placement of the uncured tire tread within the matrix. It is very important that wire coils be laterally centered or otherwise properly positioned in the rider strips of the finished tire and, in order to ensure such centering, the use of various forms of centering channels in the bottoms of the rider strip grooves has been proposed in Patent No. 2,619,678. Such centering channels function in a satisfactory way but they result in the formation of spaced circumferential ridges on the periphery of the completed tire. For certain types of tread designs such ridges are undesirable.

In the manufacture of tire treads at the present time it is common to make use of metal sipe-forming strips in the matrix which form a multiplicity of slits in the finished tread which are known in the trade as "sipes." These sipes are recognized as improving traction in the tires and, at the present time, sipes are used in a wide variety of ways in the tread design, both for purposes of appearance and to improve traction. In Patent No. 2,848,744, apparatus is disclosed wherein the centering channels of Patent No. 2,619,678 are employed for centering the wire coils and wherein transverse metal sipe strips are employed between convolutions of the coil. This patent discloses the possibility of using notches on the upper edges of the sipe strips for preventing oval coils from tilting in the mold. The sipe strips, however, in this prior patent do not perform the centering operation. This type of apparatus is subject to the objection that the coils must be so placed in the matrix grooves that the transverse metal sipe strips fit between convolutions of the coils. Thus loading of the coils is a tedious task.

It is a general object of the present invention to provide an improved method for forming tire treads wherein metal sipe-forming strips are employed in the matrix in a special manner whereby they form centering means for the elongated traction-augmenting members, such as wire coils, during the molding operation and simultaneously form desirable sipe patterns in the tread, which are both ornamental and effective in augmenting traction and reducing skid tendencies.

A further object of the invention is to provide a method as above described wherein the depressed centering channel which has heretofore been employed in the bottom of each rider strip groove can be eliminated to thus eliminate the circumferential ridges on the finished tire tread.

A further object of the invention is to provide a method for the manufacture of non-skid tire treads wherein the elongated traction-augmenting members, such as wire coils, are maintained in a desired lateral position in the grooves of the matrix throughout the curing operation and without the use of any tools or attachments other than those conventionally employed.

With the above and other objects in view, the invention consists of the improved method for manufacturing non-skid tire treads, and all of its parts and combinations, as set forth in the claims, and all equivalents thereof.

In the accompanying drawings, illustrating several embodiments of the invention, in which the same reference numerals designate the same parts in all of the views:

FIG. 4 is a large fragmentary transverse section through an outside rider strip groove of a matrix showing one arrangement of sipe strips for centering wire traction coils;

FIG. 5 is a view similar to FIG. 4 showing loosely-woven braided rope or cord, as a traction-augmenting member, centered between the sipe-forming strips;

FIG. 6 is a view similar to FIG. 4 showing wear-resistant rubber strips containing circumferentially-spaced metal studs;

FIG. 7 is a fragmentary transverse sectional view through a part of a matrix showing elongated barbed traction-augmenting units held in laterally located position between the sipe-forming strips;

FIG. 8 is a perspective view showing a short length of one of the traction-augmenting units used in FIG. 7; and FIG. 9 is a fragmentary plan view looking at the periphery of a tire and illustrating one of the rider strips thereof with one of the wire traction-augmenting units of FIG. 8 embodied therein, and showing the rows of sipes on each side thereof.

Figure 1:
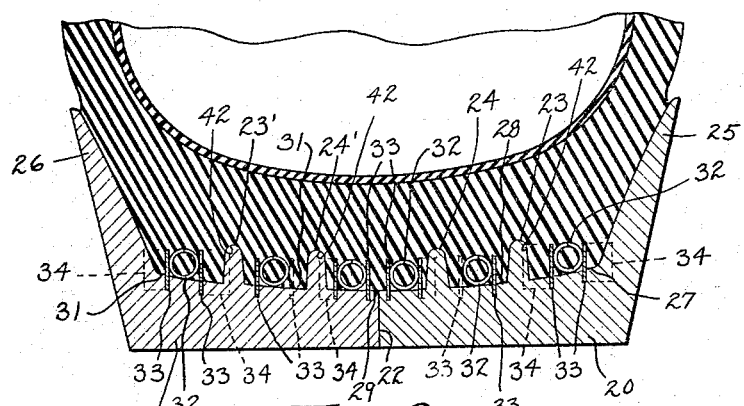
FIG. 1 is a fragmentary transverse sectional view taken through a portion of a matrix during a curing operation, the mold being omitted.

Referring more particularly to FIG. 1 of the drawing, the improved apparatus may be used either for retreading operations or for the manufacture of new tires. It includes complementary circular matrix sections 20 and 21 which meet at a circumferential parting line 22. These matrix sections are designed for use in a mold in the manner shown in FIGS. 1 and 2 of Crooker Patent No. 2,619,678, the operation of which is fully described in said patent. In this prior patent, the centering channels in the bottoms of the rider strip-forming grooves maintain the coils in a laterally-centered position in the grooves of the matrix during the curing operation, and prevent the coils from assuming an unwanted wavy configuration in the rider strip-forming grooves, with parts of the coil at the extreme sides of said grooves of the matrix. This is undesirable, as the sides of the coils are then not protected by enough rubber, and the coils may work loose in use.

Figure 2:
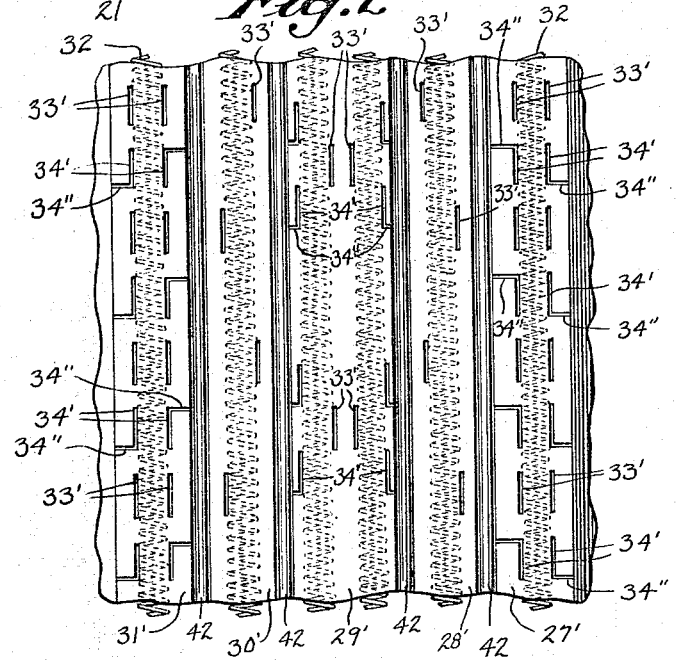
FIG. 2 is a fragmentary plan view of the periphery of a tire tread after the molding operation has been completed and after it has been removed from the matrices of FIG. 1.

Referring again to FIG. 1, the matrix sections have circumferentially-extending ribs 23 and 24 and 23' and 24' which result in the peripheral grooves 42 of the finished tread (FIG. 2). The spaces between the ribs 23 and 24, 24 and 24' and 23' and 24' provide rider strip-forming grooves, and the spaces between the outermost rider strips 23 and 23' and the wall portions 25 and 26 of the matrix sections provide outermost rider strip-forming grooves. Any selected number of such ribs 23–24 may be provided in the matrix, depending upon the number of rider strips desired on the tire. Also, the arrangement may be such as to provide rider strips of equal width, or it may be as shown in FIG. 1 wherein the center rider strip between, the ribs 24 and 24', is of double width. Various other arrangements may be provided. In the embodiment illustrated in FIG. 1 there are five rider strip-forming grooves 27, 28, 29, 30 and 31.

A novel feature of the present invention is to so employ metal sipe-forming strips 33 and 34 in the matrix as to maintain the metal coils 32, or other elongated traction-augmenting member such as the members 36, 37 and 40 of FIGS. 5, 6 and 7, respectively, in a selected lateral position in its groove so that its sides will be desirably spaced from the sides of the groove. In the grooves 27, 28, 30 and 31 this will be a laterally centered position with respect to the groove. In the center groove 29, which is of double width, the sipe strips are arranged to maintain two coils in proper position so that the side of one coil will not contact the adjacent side of the rib 24 and so that the side of the other coil will not contact the adjacent side of the rib 24'. While the embodiments of the present invention show the sipe strips arranged to maintain the coils in circumferentially straight lines, it is to be understood that the sipe strips may be so arranged as to maintain the coils in any other selected condition in a groove, such as in a properly located condition in zigzag or curved grooves of snow tire matrices.

Referring to FIGS. 1 and 2, there are two types of metal sipe-forming strips used in the illustrated embodiment, relatively short straight strips 33, and strips 34 which are L-shaped in plan view. If desired, all straight strips 33 may be employed, or all L-shaped strips 34, or sipe strips of other shapes may be used, as long as they have extents which can be directed longitudinally of the matrix grooves to serve in maintaining the traction members 32 in selected laterally maintained positions in the grooves, such as in laterally centered positions.

Figure 3:
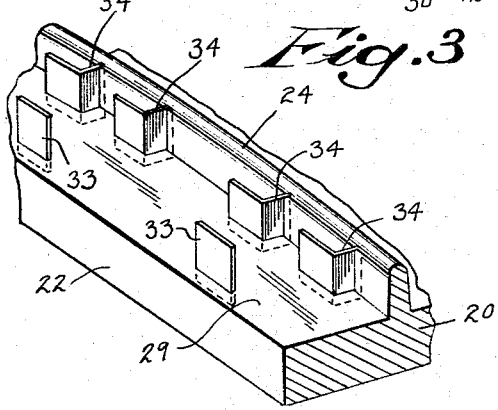
FIG. 3 is a fragmentary perspective view illustrating a portion of the matrix of FIG. 1 immediately to the right of the circumferential parting line.

In the embodiments illustrated, the outermost grooves 27 and 31 comprise pairs of straight strips 33 and pairs of L-shaped strips 34. These may be arranged in any selected manner but, as shown, the pairs of L-shaped strips 34 alternate with the pairs of straight strips 33, and the L-shaped strips 34 are reversed in position on the two sides of the same coil 32. With this arrangement, when the tire tread is completed as in FIG. 2 there will be spaced circumferentially-extending slits or sipes 33' formed by the sipe strips 33 of the matrix, and spaced L-shaped slits or sipes 34' formed by the L-shaped sipe strips 34. The circumferentially-extending sipes 33' and the straight sides of the sipes 34' will be effective in preventing sidewise skids, and the transverse sipe portions 34'' will be effective in producing start-up and stopping traction, and for all other purposes for which transverse sipes are commonly used. The metal sipe-forming strips 33 and 34 may be secured in any desired manner to the matrix sections, but they preferably have edges embedded in the metal to permanently hold the sipe strips in position, as shown in FIG. 3.

In the grooves 28 and 30, as shown in the illustrated embodiment of FIG. 1, only straight sipe strips 33 are employed to form sipes 33' on the tire. In the centermost groove 29, which is of double width in the illustrated embodiment, each of the coils 32 has its outer side resting against the straight side of an L-shaped sipe-forming strip 34 to thereby provide an L-shaped sipe 34'' on the outer side of each of the center coils, as shown in FIG. 2. The insides of the center coils contact straight sipe strips 33 and produce straight circumferentially-extending sipes 33' on the tire as in FIG. 2. It is clear that the sipe-forming strips 33 and 34 in the matrix sections 25 and 26 of FIG. 1 are arranged in a circumferential manner to produce the results shown on the tire in FIG. 2. It is also to be understood that the sipe-forming strips may be placed either closer together in a circumferential direction, or farther apart, depending upon requirements, or upon the tread design desired.

FIG. 4 shows a pair of straight metal sipe strips 33 in an outer groove 27 for centering a wire coil 32. It is preferred to have a very slight amount of draft (such as 2°) for the strips 33 to facilitate withdrawal of the tire tread from the matrix. This draft, however, of the left-hand sipe strip 33 of FIG. 4 should preferably be not substantially greater than the slight draft 35 on the side of the rib 23 of the matrix 25. This draft, however, is not as important as it is in molding of rigid materials, as the rubber of a tire tread will, of course, give as it is being removed from the matrix.

In FIG. 5 is illustrated how the features of the present invention may be employed to hold a different type of elongated traction-augmenting member. Here a traction-augmenting member 36 is maintained in centered condition in the groove 27 by the sipe strips 33. The member 36 is a loosely-woven braided rope or cord which may be formed of nylon, or other plastic fiber or other material having traction-augmenting properties, which will continue as it wears away with the rider strip.

FIG. 6 shows how the sipe strips of the present invention may be employed to facilitate the molding of special wear-resistant rubber strips 37 in the rider strips of a tire, which wear-resistant strips may contain longitudinally-spaced metal traction studs 38. These strips 37 may be of ordinary rubber but act as carriers for the studs 38 and be adapted to form part of the tire tread, or the traction-augmenting strips 37 may be of a special wear-resistant rubber, or may have special anti-skid ingredients therein such as nut shell particles, shredded wire, corn husks, or the like.

FIG. 7 shows how the sipe strips 33 of the present invention may be employed to hold still another type of elongated traction-augmenting member in position in a rider strip-forming groove such as the groove 27. Here there is illustrated an elongated traction-augumenting unit of the barbed wire type where barbs 39 are anchored in braided wire 40, the idea being to have these members so supported during molding that they will extend longitudinally of a rider strip 41 of a tire (FIG. 9) with the ends of the barbs projecting outwardly to the surface of the tire as illustrated, and with sipes 33' formed by the sipe strips 33 which also act to hold the traction-augmenting member of FIGS. 7 and 8 in proper position during molding. In FIG. 9, the rider strip 41 is separated from adjacent rider strips by the grooves 42 which are formed by the peripheral ribs, such as the ribs 23 and 24 of the matrix of FIG. 1.

In forming a new tire or in a retreading operation, the matrix 25–26 is used, with the sipe-forming strips arranged around the inner circumference thereof to produce the tread pattern shown in FIG. 2. The metal coils 32 are cut to a length somewhat longer than the circumference of the base of the rider strip-forming grooves 27–31 of the matrix. The coils 32 are then placed in the positioning channels formed by the sets of sipe-forming strips 33 and 34, with the ends of the coils abutting. Because of the outward pressure exerted by the coils, due to the fact that they are longitudinally compressed because of the excess length, the coils maintain themselves firmly seated in the channels formed by the sets of sipe strips.

After the coils have been positioned in the sipe strip channels, a tire to be treated is inserted in the mold and, through the use of steam and pressure, the uncured rubber "camelback" is forced into the matrix pattern, as fully explained in Patent No. 2,619,678. This pattern consists of spaced grooves 27, 28, 29, 30 and 31, with the coils 32 seated between the sets of sipe strips 33 and 34. Under heat and pressure the uncured rubber of the "camelback" flows into the grooves and between the sipe-forming strips, and around and between the convolutions of the coils to conform to the matrix pattern in the manner shown in FIGS. 1 and 2. With the continued application of predetermined amounts of heat and pressure for a predetermined period of time, the uncured camelback becomes cured. After the tire is removed from the mold there will be a tread pattern consisting of spaced rider strips 27', 28', 29', 30' and 31' (FIG. 2), separated by circumferential tire grooves 42. Each rider strip will have coils 32 embedded therein and extending longitudinally thereof, with the outermost portions of the convolutions of the coils exactly flush with the peripheries of the rider strips 27'-31'. Thus, with the present apparatus, the tire tread is devoid of the objectionable ridges formed by the recessed centering channels of the method of prior Patent No. 2,619,678. Furthermore, each rider strip will have a selected sipe pattern such as is shown at 33' and 34' in FIG. 2. Thus, sipes may be formed simultaneously with the use of traction-augmenting coils without having the tedious loading operation of Patent No. 2,756,460 where a transverse sipe strip must be caused to enter between each of the convolutions of each coil as the coils are inserted in the matrix.

In the tread pattern of FIG. 2, as the tire wears, the tops of the coils wear off leaving a multiplicity of wire points to produce excellent traction particularly for icy conditions. In addition, the tire has the traction-augmenting properties produced by the particular sipe arrangement selected, which may consist of both circumferentially-extending and transversely-extending sipes as illustrated in FIG. 2.

The same procedure is followed in molding tires with the braided traction-augmenting cord 36 of FIG. 5, the cord merely replacing the coils 32 of FIG. 2.

The same procedure heretofore described is also used in applying the elongated traction-augmenting members 37 of FIG. 6. As heretofore described, these members 37 may be of special wear-resistant rubber, or may be formed of rubber having anti-skid ingredients therein. These rubber strips are molded into the rider strips of the tire tread and replace the coils 32 of FIG. 2. If the strips 37 are used as a carrier for spaced studs 38, then there will be circumferentially-spaced stud points at the periphery of each rider strip 27'-31' of the tire tread, the number of which are dependent upon the spacing of the studs 38 in the carrier strips 37.

In handling the traction-augmenting members of the type shown in FIGS. 7 and 8, the same procedure is followed as heretofore described in connection with FIGS. 1 and 2, and in connection with the use of coils 32. Here, however, the members 39-40 replace the coils 32. Because the members of FIG. 8 are relatively narrow, the sipe-forming strips may be positioned closer together, as is indicated in FIG. 7, so as to ensure maintaining the barbs 39 in upright position so that the points of the barbs 39 are at the periphery of the tire when the tire is completed, as shown in FIG. 9.

Various other changes and modifications may be made without departing from the spirit of the invention, and all of such changes are contemplated as may come within the scope of the claims.

What I claim is:

1. In a method of forming non-skid siped tire treads with the use of a tire molding machine the steps of securing sipe-forming strips in the bottom of the mold with circumferentially-directed extents arranged in pairs of circumferentially-extending lines so that the lines of each pair form opposite sides of a channel having the bottom wall of the molding recess for the bottom of the channel, supplying elongated traction-augmenting members of a width to be snugly received in said channels, placing one of said elongated traction-augmenting members in each of said channels to extend around the circumference of the mold and so that said sipe strips will serve the dual function of maintaining the traction-augmenting members in laterally-located position and of creating sipes in the tire to be molded, and then while the traction-augmenting members are thus held and positioned forming a siped tire tread with the elongated traction-augmenting members therein.

2. In a method of forming non-skid tire treads with the use of a tire molding machine of the type which has a mold portion provided with circumferential rider strip-forming grooves having bottoms, the steps of securing sipe-forming strips in said grooves with extents in circumferentially-spaced relation and arranged in pairs of circumferentially-extending lines spaced from the sides of the grooves to provide a channel between the lines of each pair, supplying elongated traction-augmenting members each of a width to be snugly received in one of said channels, placing one of said elongated traction-augmenting members in each of said channels to extend around the circumference of the mold and so that said sipe strips will serve the dual function of maintaining the traction-augmenting members in laterally-centered position in the grooves and of creating sipes in the tire to be molded, and then while the traction-augmenting members are thus held forming a siped tire tread with the traction-augmenting members therein.

3. A method as defined in claim 2 which includes the step of arranging the spaced extends of the sipe-forming strips so as to extend parallel to the sides of the grooves.

References Cited by the Examiner

UNITED STATES PATENTS

| | | | |
|---|---|---|---|
| D. 182,913 | 5/1958 | Marick et al. | 152—209 XR |
| D. 184,749 | 3/1959 | Marick et al. | 152—209 XR |
| D. 188,167 | 6/1960 | Miller et al. | 152—209 XR |
| 2,619,678 | 12/1952 | Crooker | 18—18 XR |
| 2,644,984 | 7/1953 | Crooker | 18—44 |
| 2,756,460 | 7/1956 | Heintz | 18—44 |
| 2,832,392 | 4/1958 | Spitz | 18—18 XR |
| 2,848,744 | 8/1958 | Crooker | 18—44 |
| 3,090,417 | 5/1963 | Spelman | 152—354 |
| 3,199,567 | 8/1965 | Kunz et al. | 152—209 |

J. SPENCER OVERHOLSER, *Primary Examiner.*

J. H. FLINT, *Examiner.*